Jan. 13, 1931. H. T. KRAFT 1,789,143
MACHINE FOR BUILDING TIRE BANDS
Filed Sept. 15, 1928 3 Sheets-Sheet 1
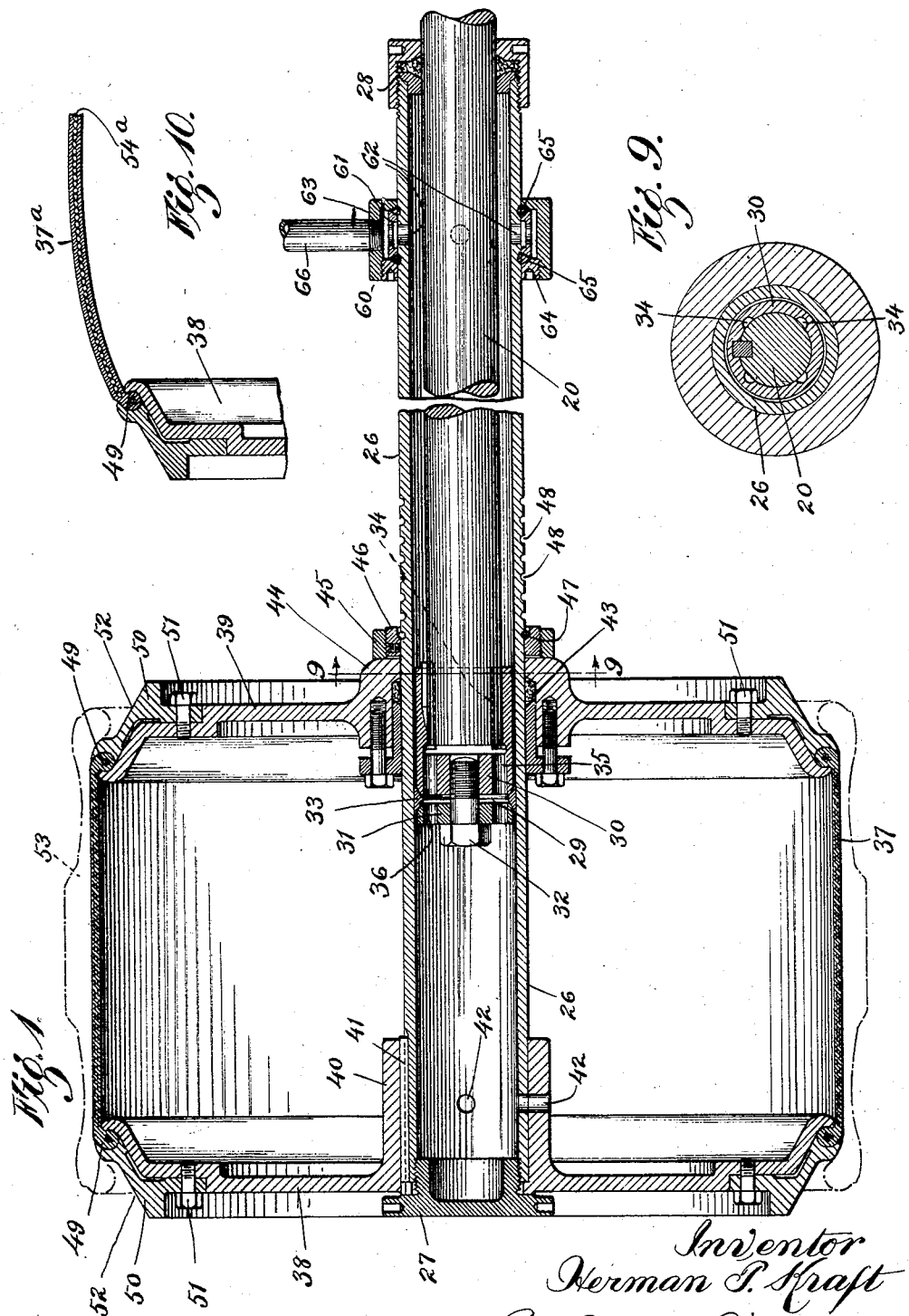

Jan. 13, 1931.    H. T. KRAFT    1,789,143
MACHINE FOR BUILDING TIRE BANDS
Filed Sept. 15, 1928    3 Sheets-Sheet 2
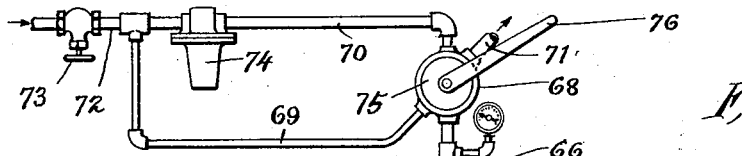
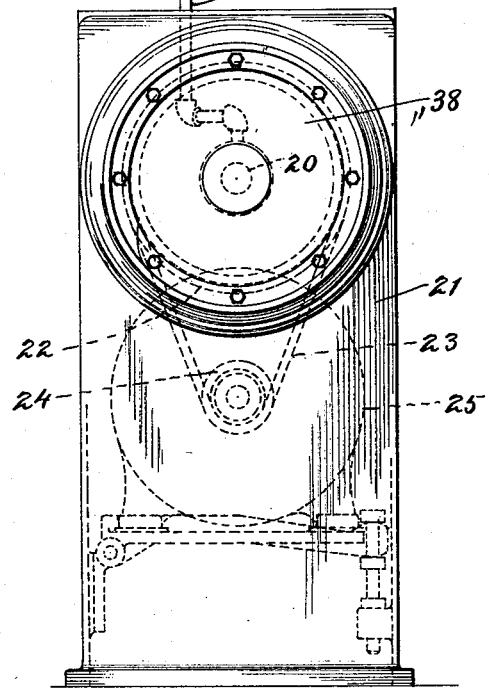
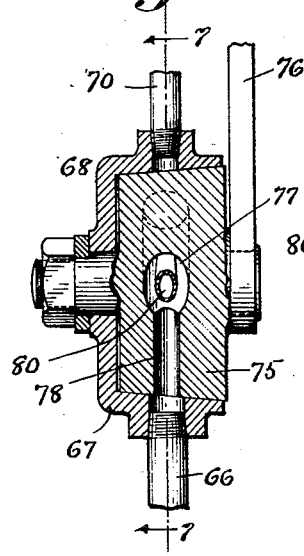
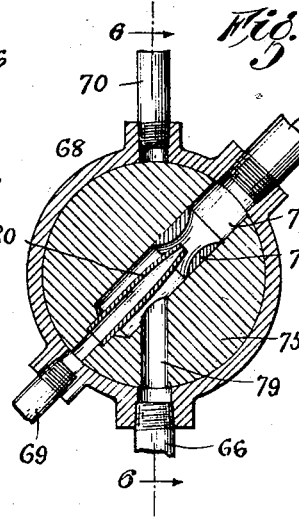

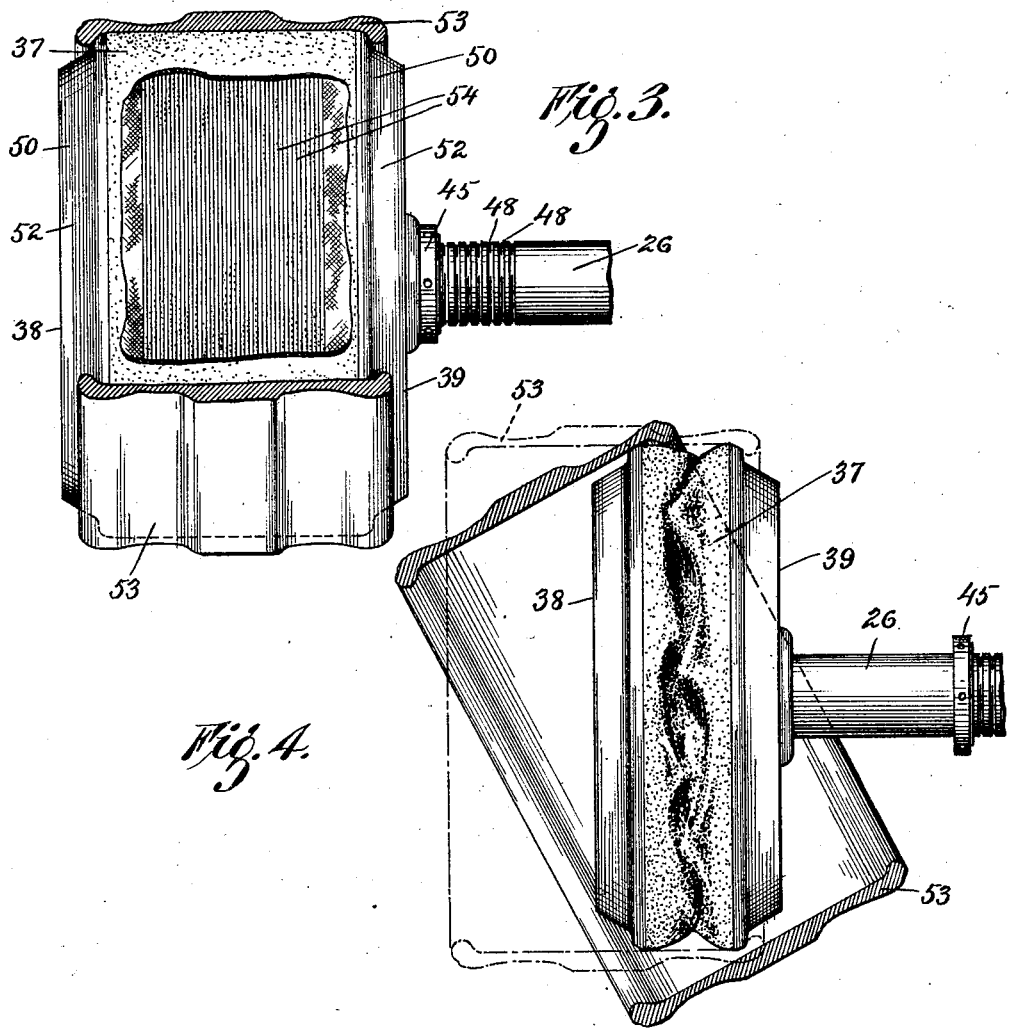

Patented Jan. 13, 1931

1,789,143

UNITED STATES PATENT OFFICE

HERMAN T. KRAFT, OF AKRON, OHIO

MACHINE FOR BUILDING TIRE BANDS

Application filed September 15, 1928. Serial No. 306,166.

This invention relates to machines for use in building bands to be formed into pneumatic tire casings according to the so-called flat band or pulley band process.

Heretofore these bands, when of the inextensible-bead variety, have commonly been made on radially-collapsible, segmental drums whose cost of manufacture and maintenance is rather high. My object is to provide a band-building drum and operating means therefor which may be built and maintained at a lower cost, which will involve greater ease in operating the drum and removing the finished tire band and will afford better results in building bands because of the possibility of rolling their plies together against a yielding support.

In the preferred embodiment hereinafter described I provide a drum including a flexible tubular member which may be made of rubber suitably reinforced with wire, cord, threads or fabric, together with a pair of disk-like heads to which the edges of said tubular member are connected in sealed relation to form a closed drum or chamber, one of said heads being axially movable toward and from the other. On inflating said drum with a fluid such as compressed air the heads are pushed apart. The tire band may then be built upon the drum, its plies rolled down upon the yielding surface thereof and its bead edges trimmed against bead seats formed on the peripheries of the drum heads. When the drum is deflated, the heads are drawn together, the flexible member collapses between them and contracts in a radial direction sufficiently to release the tire band, and the latter may then be removed by cocking or turning it at an angle to the plane of the drum and slipping it off.

Of the accompanying drawings, Fig. 1 is a longitudinal section of my improved drum and shaft structure, a tire band being shown thereon in broken lines.

Fig. 2 is a front elevation of the drum with its stand and the connecting pipes and valves.

Fig. 3 is a side elevation of the drum with its flexible tubular member partly broken away to expose the reinforcement, and with a tire band thereon, partly broken away.

Fig. 4 is a side elevation of the drum in collapsed condition with the tire band in two positions shown respectively in broken and full lines.

Fig. 5 is a sectional view showing the wall construction of the tubular member and its connection with one of the drum heads.

Fig. 6 is a longitudinal section of the air-control valve, taken on the line 6—6 of Fig. 7.

Fig. 7 is a transverse section of said valve on the line 7—7 of Fig. 6, in its vacuum or drum-deflating position.

Fig. 8 is a view similar to Fig. 7 showing the valve in its pressure or drum-inflating position.

Fig. 9 is a cross-section on the line 9—9 of Fig. 1.

Fig. 10 is a sectional view showing a modified form of the tubular member.

In the drawings, 20 is a horizontal shaft mounted to rotate in suitable bearings on a hollow standard 21 (Fig. 2) and provided with a large pulley 22 whereby said shaft is driven through a belt 23 from a smaller pulley 24 on the shaft of an electric motor 25 contained in the standard. Said motor is provided with suitable starting and stopping devices (not shown) and may be rotated in either direction at one or more speeds as is customary in tire-building machines.

The shaft 20 projects forwardly from the front of the standard 21 and has mounted thereon a hollow shaft 26 which supports the building drum, said hollow shaft being closed at its outer end by a screw plug 27 and at its inner end by shaft 20 and a stuffing-box 28 for sealing the opening between the two and permitting the hollow shaft to be adjusted longitudinally on the inner shaft when it is desired to line up the drum with auxiliary apparatus such as stock rolls. The hollow shaft is fixed in the desired position upon the inner shaft by means of a friction chuck 29 consisting of a counter-bored cylindrical block 30 keyed to the end of shaft 20 and beveled at its outer end, a wedging plate 31 beveled at its inner end and held to the block 30 by a screw-bolt 32, and an expansible gripping ring 33 reversely beveled on its inner periphery and having a cylindrical outer surface engaging the inner surface of the hollow shaft 26. The head of the bolt 32 may be reached with a socket wrench through the opening closed by the block 27. The block 30 is formed with channels 34 and apertures 35 and the clamping plate 31 with apertures 36 for conducting through this chuck the air or other fluid for operating the drum.

The forming drum proper comprises a flexible tubular member 37 and a pair of disk-like circular heads 38, 39 connected in sealed relation to the edges of said tubular member. These heads are mounted for relative axial movement for the purpose of expanding and collapsing the drum in an endwise direction, and one of them, in this instance the front disk 28, has its hub 40 fixed on the end of the hollow shaft 26 by a key 41, the hub and shaft being formed with lateral apertures 42 connecting the interior spaces of said hollow shaft and drum.

The head 39 is axially slidable on the hollow shaft 26 and is sealed with relation thereto by a stuffing-box 43 on the hub 44 of said head, whose gland is adjustable from the interior of the drum when the front head 38 has been removed.

In order to limit the axial strain upon the tubular member 37, which in some cases is made longitudinally stretchable as hereinafter described, and to determine the width of the tire band being made in such cases, I provide a stop collar 45 upon the hollow shaft 26, against which the hub 44 of disk 39 abuts. This collar is threaded for fine adjustment upon a sleeve 46 and said sleeve may be fixed in any one of a number of different positions longitudinally of the hollow shaft by means of a transversely-split locking ring 47 overhung by the sleeve 46 and adapted to occupy any one of a number of circumferential grooves 48 externally formed in said hollow shaft. By backing off the head 39 and the sleeve 46 in a leftward direction as viewed in Fig. 1, the locking ring 47 will be exposed and may then be changed to a different groove 48 and the sleeve restored to its ring-retaining position.

The axially-movable head 39 also comes to a positive stop at the limit of its leftward or drum-collapsing movement by the abutting of a part of its hub structure, such as the heads of its gland-adjusting bolts, against the end of the hub 40 of the front disk 38, whereby an excessive degree of flexure of the tubular member 37 is avoided.

The tubular member or band 37 is made of a flexible and impervious combination of materials of which a chief ingredient may be vulcanized rubber, together with a reinforcement having certain characteristics hereinafter described, and is formed at its edges with inwardly turned beads 49 let into grooves in the outer peripheries of the heads 38, 39 in such manner as to provide substantially fluid-tight joints with said heads. Preferably these edge connections are made detachable in order that the tubular member 37 may be removed and replaced, when desired, without removing the main part of either of the heads 38, 39. For this purpose each said head is made with a main body and a detachable bead-clamping ring 50, the two parts together forming the bead groove and the ring being secured to the disk body by screw-bolts 51. The two rings 50 are formed with frustums 52 of cones having their bases toward each other and constituting seats on the peripheries of said heads on which to build the beads of the tire-forming band and perform any trimming that may be required on the edges of the tire fabric.

The tire-forming band is represented conventionally at 53 in Figs. 1, 3 and 4.

The flexible tubular member 37, which when extended longitudinally constitutes a form for supporting the tire material and determining the circumferential length of the band made of said material, should be substantially inextensible in a radial direction and each of its zones or circles should remain of a fixed diameter when said band is filled out to its working position. It is preferably of composite construction such as vulcanized rubber reinforced with cords, threads or wire, woven or unwoven, and containing a sufficient number of strength-giving elements running circumferentially of the drum to make the member 37 practically inextensible in a radial direction. The circumferential cords or threads 54 (Figs. 3 and 5) are closely spaced and preferably laid in a plurality of superimposed plies as indicated in Fig. 5. Ordinary weak-wefted or weftless thread fabric such as is used for building pneumatic tire casings may be employed in this connection. If desired, one or more layers of such fabric may be laid at a slight angle or bias from the true circumferential line and alternated with the layers of straight-laid threads to maintain the uniformity of tube-wall structure and avoid local soft spots therein when the tubular member is subjected to stretching.

For building tire bands of the same diameter but different widths upon the same drum the tubular member 37 is made stretchable in an axial direction and in such a member I dispose the reinforcing elements wholly in a circumferential or nearly circumferential direction as described, so that said elements may separate slightly, allowing the rubber and the member 37 as a whole to stretch in a direction parallel to the axis of rotation. For a drum to be used for making tire bands of a single width only, the member 37 may be reinforced axially as well as circumferentially, and could in that case be made of a flexible material which is inextensible in both directions, such as leather or straight-laid, square-woven fabric treated to make it impervious.

The beads 49 are made substantially inextensible by means of cores 55 which may consist of windings of wire or thread, and each core is surrounded by a filler 56 of stiff rubber composition. Binding or chafing strips 57 of bias-laid, square-woven, rubberized fabric surround the bead fillers and overlap for a considerable distance on the thread layers 54, these binding strips serving to make the tube progressively less extensible in an axial direction as the beads are approached. Suitable facings layers 58, 59 of rubber are provided on both sides of the tube wall, and all elements of member 37 are integrally vulcanized together.

The operating fluid is conducted to and from the interior of the hollow shaft 26 through a coupling 60 consisting of a radially-perforated, rotary ring 61 axially alined with holes 62 in the hollow shaft, a fixed ring 63 surrounding it, a plug ring or nut 64 screwing in the end of said fixed ring, and a pair of outwardly-tapering, lead packing gaskets 65 let into grooves formed in the hollow shaft 26 and interposed between beveled surfaces respectively on the ends of the ring 61 and on the back-flange of the ring 63 and the nut 64, the nut 64 being adjustable to afford a running rotary fit of the coupling 60 on the shaft 26, with minimum leakage.

The ring 63 receives the end of a pipe 66 connecting with the casing 67 of a control valve 68, said casing also connecting with a high-pressure air pipe 69, a low-pressure air pipe 70 and an exhust pipe 71. The pipes 69 and 70 connect with a common air-supply pipe 72 containing a stop-valve 73, and pipe 70 contains an automatic pressure-reducing valve 74. The low-pressure air is used to inflate the drum and the high-pressure air is carried through an ejector to produce a vacuum for deflating and collapsing the drum.

Valve casing 67 is provided with a tapered seat to which is fitted a tapered plug valve 75 provided with a handle 76 for turning it to its different positions. This plug is diametrically bored with a passage 77 containing a Venturi sleeve 78, and with a lateral passage 79 leading from the periphery of the plug to the passage 77, on the suction side of the Venturi sleeve. Fitted in the inlet end of the passage 77 is a nozzle 80 discharging into the throat of the Venturi sleeve 78, this combination forming an ejector within the valve plug 75. Said valve plug may occupy a drum-deflating position shown in Fig. 7, a drum-inflating position shown in Fig. 8, or an intermediate position in which all ports are blanked.

In the operation of this apparatus, compressed air at a suitable high pressure, such as 30 pounds per square inch, may be supplied to the pipes 72 and 69 and, in bypassing through the pipe 70, this pressure will be reduced by the automatic valve 74 to, say, 8 or 10 pounds per square inch. The plug valve 75 is placed in the position shown in Fig. 8 and compressed air at the low pressure of 8 or 10 pounds passes by way of the pipe 70, backward through the ejector passage 77 and ejector nozzle 80, through the pipe 66, coupling 60, and hollow shaft 26 into the interior of the drum, where it acts to push the movable head 39 away from the fixed head 38 and extend the flexible, tubular member 37 until said movable head is arrested by the stop-ring 45. The position of this stop determines the width (or axial length) of the tire band to be built on the drum, and said width may be varied for different bands of the same diameter by employing an axially-stretchable member 37 as described, fixing the position of the stop-sleeve 46 by placing the split locking ring 47 in the appropriate groove 48 and obtaining a fine adjustment, if necessary, by screwing the stop collar 45 in or out on said sleeve.

The extension of member 37 draws it taut, its circumferential reinforcing threads prevent it from radially extending beyond the desired diameter, and the inflation of said member keeps it out to this diameter. The drum being thus extended, as indicated in Figs. 1 and 3, the tire-forming band 53 is built up thereon in the usual manner while said drum is being rotated by power applied to its shaft 20 from the electric motor 25. The building operation usually includes a pressing together of the plies of tire material by a hand roller held by the operator in order to exclude air from between said plies and secure proper adhesion between their tacky rubber surfaces. The yielding surface afforded by my inflated flexible drum wall distributes this pressure better than the rigid surface of the ordinary metal drum, and hence makes the rolling operation more effective.

When the building of the tire band is completed, and preferably while the drum is still being rapidly rotated, the operator shifts the plug valve to the vacuum position shown in Fig. 7, cutting off the low-pressure inlet from pipe 70 and establishing a high-pressure air flow from the pipe 69 through the ejector parts 80 and 78 and out through the exhaust pipe 71. The ejector action creates a partial vacuum in the interior of the drum, drawing down the pressure therein to about half an atmosphere with the single ejector stage shown herein. More stages could be added if a higher vacuum and more rapid exhaustion is desired.

The pressure of the external atmosphere acting on the movable head 39 and on the flexible drum wall 37 simultaneously presses said head toward the fixed head 38 and collapses the unsupported portions of the flexible member radially inward, causing it to assume substantially the folded condition represented in Fig. 4, until finally the movable head is stopped by the abutting of its hub structure against the hub 40 of the fixed head. The rotation of the drum during its endwise and radial collapse assists in breaking the adhesion and admitting air between the tire band and the drum surface through the action of centrifugal force upon the band. The axial approach of the movable head 39 towards the fixed head 38 is accompanied by some turning or twisting of said movable head on the shaft 26, the direction of which may possibly be due to the direction of twist in the reinforcing threads 54, and this turning or twisting action promotes regularity in the folding of the tubular member 37.

Prior to the laying of the first ply of tire material on the drum the operator usually coats one or both of the bead seats 52 with rubber cement. When the tire band is finished, the adhesion between it and the drum at the front edge of said band may be broken with the aid of a suitable tool and the tire band 53 will advance with the movable head 39 during the collapse of the drum to the position indicated in broken lines in Fig. 4. To remove said tire band, the drum is stopped from rotating and the band is then cocked or turned at an angle to the plane of the drum as indicated in full lines in Fig. 4, its top edge is brought forward to clear the periphery of the front head 38 and it may then be slipped off by dropping it downwardly or transversely of the axis of rotation free of said drum, the band becoming slightly elliptical or lengthened in diameter horizontally in order to clear the maximum diameter of the two drum heads, which exceeds the diameter of the tire beads when the latter are in circular form.

My invention provides a much simpler structure than the radially-collapsible, segmental tire drums heretofore employed in the flat-band building process; it is cheaper to construct and maintain; it relieves the operator of fatigue by a novel application of pneumatics, or fluid-pressure operating force, to the collapse and extension of the drum; it provides for easy removal of the band without encountering any sharp surfaces; and it affords certain advantages in the building operation as above set forth.

While the drum, as here illustrated, is intended for an inextensible-edged tire band whose beads are located below or within the circle of the middle or flat portion of the band, it might obviously be modified to make bands whose beads are of approximately the same diameter as said middle portion. On the other hand, the invention also applies to the making of tire bands with a middle portion in transversely-convex or arched form instead of transversely flat, so that when the band is formed into tire shape by the vacuum process or otherwise, the middle of the fabric will not have to be stretched so far. Thus, in the modification shown in Fig. 10, a flexible tubular member 37$^a$ of transversely concavo-convex shape is illustrated. The reinforcement 54$^a$ of this band may take the form of a single strand or a narrow strip of cord or the like wound continuously in adjacent circumferential convolutions from edge to edge, the convolutions progressively increasing in length from the edges toward the middle of the tubular member. Obviously various other modifications in form, arrangement and structure could be made within the scope of my invention as defined by the claims.

I claim:

1. In a tire-band building machine, the combination of an endwise-collapsible drum having a flexible surface, substantially non-expansible radially of the drum, and means for rotating said drum.

2. In a tire-band building machine, the combination of a rotatable drum including a pair of heads relatively movable toward and from each other, a flexible, radially-inexpansible tubular member forming with said heads a sealed chamber, and means for inflating said chamber.

3. In a tire-band building machine, the combination of an endwise-collapsible, hollow drum, whose peripheral wall is a flexible, radially-inextensible tubular member for supporting the tire material, means for rotating said drum, and means for exhausting its interior to cause the collapse of the drum by external atmospheric pressure.

4. In a tire-band building machine, the combination of a hollow shaft, a drum thereon comprising a pair of heads one of which is axially slidable on said shaft toward and from the other and a flexible, radially inextensible tubular member forming the peripheral wall of said drum, and means connected with said hollow shaft for inflating and deflating the drum to extend and collapse it.

5. In a tire-band building machine, the combination of a rotary, hollow shaft, a collapsible building drum thereon, a pipe having a coupling in rotative relation to said shaft, means for introducing compressed air into the shaft and drum through said pipe, and means for producing a vacuum in said pipe.

6. In a tire-band building machine, a rotary drum comprising a pair of heads having bead seats for a laterally-extended tire band, and an intermediate support for the tire material, said heads being approachable to a position permitting the removal of the band by turning it at an angle to the plane of said heads and then slipping it free of the heads in a direction transverse to their axis of rotation.

7. In a tire-band building machine, the combination of a rotary shaft, a building drum thereon comprising a pair of heads provided with bead seats, and an intermediate band support of greater diameter than said seats, adapted to collapse between the heads and permit their approach to a position where the band may be removed by turning it at an angle to the heads and slipping it off transversely of said shaft.

8. A tire-drum structure comprising an inner, rotary shaft, an outer, hollow shaft, telescoping thereon and constituting a fluid conduit, means for fixing said hollow shaft in different positions longitudinally of the inner shaft, and a hollow, collapsible, forming drum on said hollow shaft, having its interior space in communication therewith.

9. A tire-drum structure comprising an inner, rotary shaft, an outer, fluid-conducting, hollow shaft telescoping thereon, an expansible chuck connecting said shafts, and a hollow, collapsible forming drum mounted on said hollow shaft and inflatable and deflatable therethrough.

10. An inflatable, hollow drum for forming tire bands, comprising a pair of heads mounted for relative approaching and receding movement, and a flexible, tubular band support, substantially non-elastic in a radial direction, having its edges in sealed relation to said heads.

11. An inflatable, hollow, tire-band forming drum comprising a pair of heads mounted for relative axial movement, and a flexible, tubular band support in sealed connection with said heads, said support being composed of rubber reinforced in its flexing zone with a circumferential cord structure making it substantially non-stretchable in a radial direction.

12. An inflatable, hollow, tire-band forming drum comprising a pair of heads mounted for relative axial movement and formed with bead grooves, and a radially-inextensible, flexible, tubular band support having beads mounted in said grooves.

13. An inflatable, hollow, tire-band forming drum comprising a pair of heads mounted for relative axial movement, and a radially-inextensible, flexible, tubular band support having its edges detachably connected in sealed relation to said heads.

14. A drum structure for forming tire bands comprising a shaft, a drum head thereon, a second drum-head slidable along said shaft, a stop axially adjustable on said shaft for limiting the receding movement of said slidable head, and a radially-inextensible, axially-stretchable, flexible, tubular band support connecting said heads.

15. A band-support for tire-building drums comprising a flexible, tubular member of approximately flat transverse form, having beaded edges and composed of rubber and a circumferential reinforcement vulcanized thereto for making it radially inextensible.

16. A band-support for tire-building drums comprising a flexible, tubular, axially-stretchable member of approximately flat transverse form, having beaded edges and composed of rubber and a circumferentially-extending, substantially-inextensible reinforcement, the middle zone of said member being substantially without transverse reinforcement.

In witness whereof I have hereunto set my hand this 13th day of September, 1928.

HERMAN T. KRAFT.